US008311808B2

(12) United States Patent
Tinkler

(10) Patent No.: US 8,311,808 B2
(45) Date of Patent: Nov. 13, 2012

(54) SYSTEM AND METHOD FOR ADVANCEMENT OF VOCABULARY SKILLS AND FOR IDENTIFYING SUBJECT MATTER OF A DOCUMENT

(75) Inventor: Marc Tinkler, New Brunswick, NJ (US)

(73) Assignee: Thinkmap, Inc., New York, NY (US)

( * ) Notice: Subject to any disclaimer, the term of this patent is extended or adjusted under 35 U.S.C. 154(b) by 311 days.

(21) Appl. No.: 12/638,733

(22) Filed: Dec. 15, 2009

(65) Prior Publication Data

US 2011/0144978 A1 Jun. 16, 2011

(51) Int. Cl.
*G06F 17/21* (2006.01)
*G06F 17/20* (2006.01)
*G06F 17/27* (2006.01)

(52) U.S. Cl. .................................. 704/10; 704/1; 704/9

(58) Field of Classification Search .......................... None
See application file for complete search history.

(56) References Cited

U.S. PATENT DOCUMENTS

| | | | | |
|---|---|---|---|---|
| 4,862,408 A * | 8/1989 | Zamora | .................. | 1/1 |
| 5,043,891 A * | 8/1991 | Goldstein et al. | ............. | 715/234 |
| 5,371,673 A * | 12/1994 | Fan | .................. | 704/1 |
| 6,023,670 A * | 2/2000 | Martino et al. | .................. | 704/8 |
| 6,120,297 A * | 9/2000 | Morse et al. | .................. | 434/169 |
| 7,052,278 B2 * | 5/2006 | Johnson et al. | .............. | 434/156 |
| 7,130,861 B2 * | 10/2006 | Bookman et al. | ...................... | 1/1 |
| 7,647,345 B2 * | 1/2010 | Trepess et al. | .................. | 707/771 |
| 7,853,544 B2 * | 12/2010 | Scott et al. | ...................... | 706/46 |
| 2004/0189696 A1 | 9/2004 | Shirriff | | |
| 2006/0277046 A1 | 12/2006 | Lachish et al. | | |
| 2007/0112554 A1 | 5/2007 | Goradia | | |
| 2009/0094233 A1 * | 4/2009 | Marvit et al. | ..................... | 707/5 |
| 2009/0197225 A1 | 8/2009 | Sheehan et al. | | |

OTHER PUBLICATIONS

Hakuta et al. "WordSift: Using Computer-Assisted language Learning to Increase ELs' Math and Science Literacy". Web Presentation for the National Clearinghouse for English Language Acquisition, Sep. 24, 2009.*
Wientjes, Greg. www.wordsift.com, accessed Jan. 20, 2009.*
Coxhead, Averil. An Introduction to the Academic Word List. ELI Occasional Publication 18, Victoria, University of Wellington, New Zealand, 1998.*
WordSift—Visualize Text website, "*About,*" "*Features,*" "*Background Theory,*" "*Word Lists,*" "*Tips,*" and "*Acknowledgments*" sections, retrieved from http://www.wordsift.com/ on Dec. 17, 2009.
Diego Puppin, "*Inside Google books: Explore a Book in 10 Seconds,*" posted Jul. 1, 2009, retrieved from http://booksearch.blogspot.com/2009/06/explore-book-in-10-seconds.html on Dec. 17, 2009.
Wayne Porter, "*Amazon SIPs—SIPs are Statistically Improbable Phrases in Books and more,*" posted Oct. 26, 2006, retrieved from http://www.wayneporter.com/?p=156 on Dec. 17, 2009.

(Continued)

*Primary Examiner* — Jesse Pullias
(74) *Attorney, Agent, or Firm* — Kenyon & Kenyon LLP

(57) ABSTRACT

A system and method for providing vocabulary information includes one or more computer processors that, for each of a plurality of words of a text, determine a relevance of the word to the text, and, for each of at least a subset of the plurality of words, output an indication of the respective determined relevance of the word to the text, where, for each of the plurality of words, the determination includes comparing a frequency of the word in the text to a frequency threshold.

3 Claims, 4 Drawing Sheets

OTHER PUBLICATIONS

Jonathan Brown et al., "*Retrieval of Authentic Documents for Reader-Specific Lexical Practice*," Proceedings of InSTIL/ICALL 2004, Symposium on Natural Language Processing and Speech Technologies in Advanced Language Learning Systems, Jun. 2004.

Jonathan C. Brown et al., "*Automatic Question Generation for Vocabulary Assessment*," Proceedings of HLT/EMNLP 2005, Human Language Technology Conference and Conference on Empirical Methods in Natural Language Processing, Oct. 2005, pp. 819-826.

Dan Gillick, "*Sentence Boundary Detection and the Problem with the U.S.*," Proceedings of NAACL HLT 2009, Annual Conference of the North American Chapter of the Association for Computational Linguistics: Human Language Technologies, Short Papers, Jun. 2009, pp. 241-244.

Ayako Hoshino and Hiroshi Nakagawa, "*A Cloze Test Authoring System and its Automation*," Proceedings of ICWL 2007, 6th International Conference on Web-based Learning: Advances in Web-based Learning, Aug. 2007, vol. 4823, pp. 252-263.

* cited by examiner

Figure 2

SYSTEM AND METHOD FOR ADVANCEMENT OF VOCABULARY SKILLS AND FOR IDENTIFYING SUBJECT MATTER OF A DOCUMENT

FIELD OF THE INVENTION

The present invention relates to a system and method that facilitates the learning of vocabulary, e.g., by conveying information regarding words used in a context. The present invention further related to a system and method for providing a summary of a document via a list of words used in the document and/or additional information regarding the words, e.g., with respect to how the words are used in the document.

BACKGROUND

Traditional vocabulary learning methods require memorization of words and their definitions without or with little associations to help reinforce the information that has been learned. Memory retrieval cues are therefore minimal and the information is often quickly forgotten. Moreover, although vocabulary is a tool by which to communicate other subjects, the words compiled for the subject of vocabulary are often unrelated to and useless for the learning of other relevant subjects, thereby defeating an important purpose of the vocabulary learning and the continued decline in the ability to recall the learned words and/or their meanings.

For study of and research regarding a subject matter of interest, it is often advantageous to view synopses of documents to quickly determine their relevance to the subject matter of interest. Compilation of such synopses, however, can require a tedious manual process of reading the documents and writing the short summaries. Additionally, the synopses are often subjective to the individual(s) who compiles the synopses, and therefore often do not convey the subject matter to which the documents relate with sufficient accuracy to allow for a quick determination of the relevant subjects by a reader.

In authoring a document, there are various vocabulary norms to which the author can adhere for producing a high quality work, and which, if, on the other hand, are not followed, result in a work of poor quality. For example, overuse of certain words can ruin the flow of the document and distract the reader from the substance intended to be conveyed. Conventional writing systems do not provide sufficient tools for helping the author adhere to such norms.

SUMMARY

Embodiments of the present invention provide a system and method for compilation of word lists for teaching students vocabulary relevant to other subjects being taught to the students. The system and method may identify which words within a document, e.g., a text book or article, used for teaching the other subjects are least familiar of the words of the document. In an embodiment, the system and method may additionally output, for each such word, a context in which the word is used in the document.

Embodiments of the present invention provide a system and method that analyzes an input document and, based on the analysis, provides vocabulary output that conveys a summary of the document. The summary may be indicated by identifying which words of the document are most relevant to the subject matter to which the document is directed.

Embodiments of the present invention are directed to a system and method that provides a tool useful to an author to determine whether a document substantially adheres to vocabulary norms. For example, the system and method may output info nation from which one can determine whether a word has been used too many times in the document. For example, the system may indicate that a word is used significantly more times than usual. This might be an indicator that some of the instances of the word should be removed if the word is not of particular relevance to the subject which the document concerns.

In an example embodiment of the present invention, the system and method provides various statistical information regarding a document in compact form, by using different indicators for the different information in a single vocabulary list. For example, the sort order may be a first indicator, a word size may be a second indicator, and a word color may be a third indicator. Alternatively or additionally, the same information may be conveyed in a displayed table. The various forms via which to convey the information may depend on a user-selected view, which may be selected via a displayed button control, for example.

The various methods described herein may be practiced, each alone, or in various combinations.

An example embodiment of the present invention is directed to a processor, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a hardware computer-readable medium, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 2 is a screenshot of a user interface display window output according to an example embodiment of the present invention.

DETAILED DESCRIPTION

Figure 1:
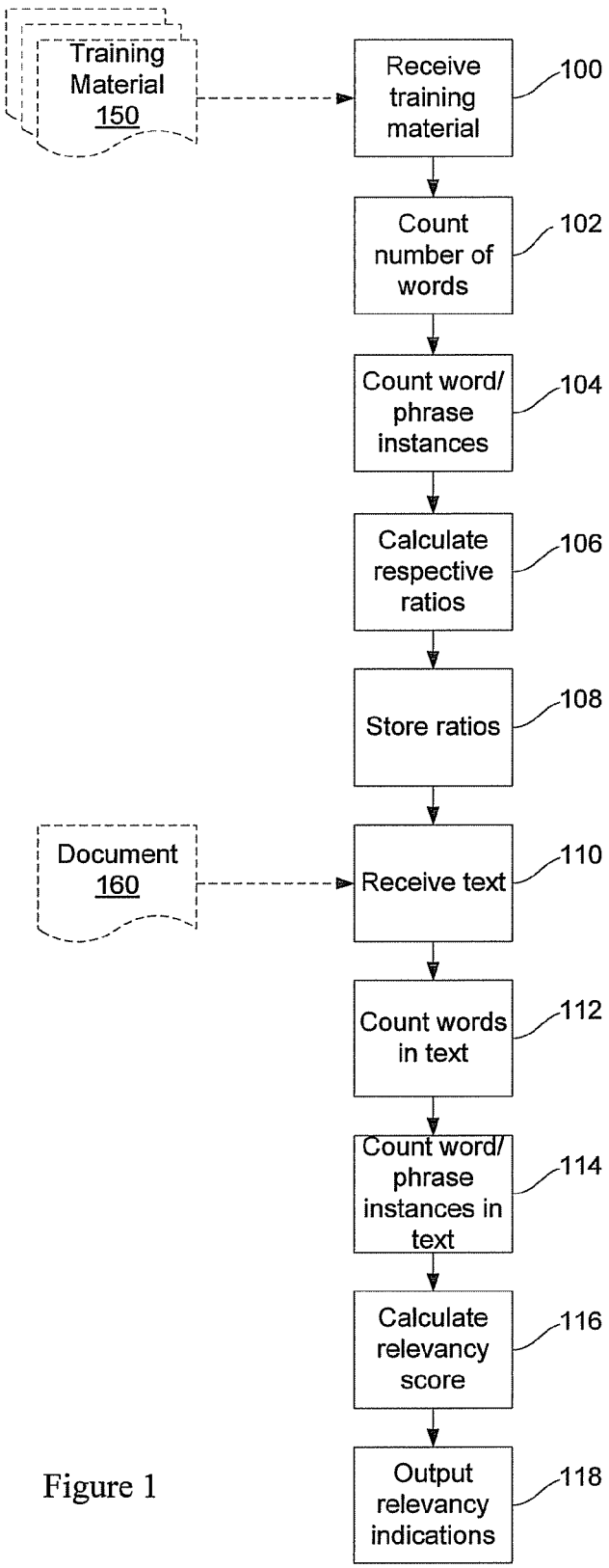
FIG. 1 is a flowchart that illustrates a method for indicating word relevance, according to an example embodiment of the present invention.

FIG. 1 illustrates a method by a computer processor executing a vocabgrabber module(s) for indicating the relevance of words in a portion of text to the subject matter of the portion of text. At step 100, the system and method of the present invention may receive input of a corpus of training material 150. At step 102, the system and method may count the number of words in the corpus of training material 150.

In an example embodiment, the system and method may additionally count strings or words to determine which string of words occur often, e.g., determined based on a comparison of the instances of the string to a predetermined threshold, and store the strings as phrases. The threshold may be variable according to the size of the corpus of training material 150. For example, the threshold may be determined by multiplying the number of words in the corpus of training material 150 by a factor. In an example embodiment, for the identification of phrases, the system and method may initially begin with small strings, e.g., two-words long. For those small strings, which the system and method has determined are to be stored as phrases, the system and method may next determine whether larger strings including the smaller strings are also to be stored as phrases using a threshold as described above with respect to the smaller strings. In an example embodiment, the threshold may be the same. Alternatively, a lower threshold may be used since larger strings are expected to be used as phrases less frequently. The process for identifying phrases may be iteratively performed, increasing the string length in each iteration, until no string meets the required threshold.

In an example embodiment, once the system and method determines to store a large string as a phrase, the system and method may determine whether to store the included small string(s) of the larger string as separate phrases, aside from the large string. This may be dependent on whether the difference in frequency of use of the smaller string(s), without the remaining portion of the larger string, and the frequency of use of the larger string is above a predetermined threshold.

At step 104, the system and method may count the instances of each different word and/or phrase, e.g., determined as described above, in the corpus of training material 150. At step 106, the system and method may calculate for each word and/or phrase a respective ratio of its occurrence in the corpus of training material 150 to the number of word in the corpus of training material 150. For example, if a word occurs 200 times in a corpus having 500 words, the ratio may be calculated as 0.4. At step 108, the system and method may store the calculated ratios.

In an example embodiment, the ratios may be updated over time upon receipt of additional training material. Additionally, whether a string is to be considered a phrase may be updated upon receipt of additional training material input. The new training material may be combined with the prior training material to form a composite training material from which the determinations are made. For example, the count of words of the initial corpus of training material 150 may be added to the count of words of the new corpus. Similarly, the counted number of occurrences of the words and phrases obtained from analysis of the initial corpus may be added to the counted number of instances of the new corpus. In an example embodiment, once a word string has been identified as a phrase to be tracked, it may continue to be treated as a phrase, regardless of any new input training material. In an alternative embodiment, phrases may be removed in view of the new material, e.g. if the necessary threshold number of occurrences of the string does not occur in the combined corpus of old and new training material. For example, if the phrase threshold factor is 0.4, then a string may be stored in a database of phrases in view of an initial corpus of 500 words, if the string occurs 200 times. If the combination of the initial corpus and the new corpus includes 700 words, but the string occurs fewer than 280 times in the combination of the initial corpus and the new corpus, the string may be removed from the database of phrases.

At step 110, the system and method may receive input of text of a document 160. For example, the entire document 160 or portions thereof may be input. The text may be input, for example, as a link to a document, via manual typing of the text, a cut-and-paste operation, or any other suitably appropriate method of input. In an example embodiment, the text of the document 160 which will be analyzed is displayed in a textbox frame of a graphical user interface (GUI), e.g., textbox 200 of FIG. 2.

At step 112, the system and method may count the number of words in the input text. For example, step 112 may be performed in response to user selection of a "Grab Vocabulary" button 206. The text in the textbox 200 may be user editable at anytime, and the method may be returned to step 112 to begin re-analysis at anytime with respect to the text included in the textbox 200, e.g., in edited form, by another selection of the "Grab Vocabulary" button 206.

At step 114, for each different word and/or considered phrase of the input text, the system and method may count its occurrences in the input text. At step 116, the system and method may calculate each different word and/or considered phrase's relevance to the subject matter of the input text. In an example embodiment of the present invention, the calculated relevance of a word or phrase is a quantification of a comparison of the word or phrase's frequency in the input text to the word or phrase's frequency in the corpus of training material 150. In an example embodiment, the relevancies are calculated using an equation of [frequency in input text]/([stored respective ratio]*[size of input text]), where the "frequency in input text" is the number of times the respective word or phrase occurs in the input text, "stored respective ratio" is the ratio that was stored at step 106 for the respective word or phrase, and "size of input text" is the number of words in the input text.

At step 118, the system and method may output an indication of the calculated relevancies. In an example embodiment, the indication may be via a sort order of the words and/or phrases. For example, the more relevant the word and/or phrase, the earlier it is displayed in the sorted list. Additionally or alternatively, the more relevant the word and/or phrase, the larger the font used for its display.

In an example embodiment of the present invention, the system and method may provide a filtering option to more clearly direct the user's attention to those words and/or phrases that have been calculated as most relevant. For example, the system and method may divide the relevancy scores calculated for the words and/or phrases into a number of, e.g., 5, categories, each category including a range of relevancy scores. For example, the system and method may evenly distribute the calculated relevancy scores to the different relevancy categories. Alternatively, the system and method may evenly divide the range of calculated scores into intervals corresponding to the categories, without regard to the actually calculated scores between the high and low calculated scores of the range. For example, according to this embodiment, if the highest score is 500 and the lowest score is 1, then the intervals assigned to the different categories may be 1-100, 101-200, 201-300, 301-400, and 401-500, regardless of the number, or if any, of the actually calculated scores fall within any one of the intervals. In an alternative embodiment, the score intervals corresponding to the categories are predetermined without regard to any of the actually calculated scores. For example, according to this embodiment, it may occur that no calculated score for a received text falls within the highest relevancy category.

Figure 2:
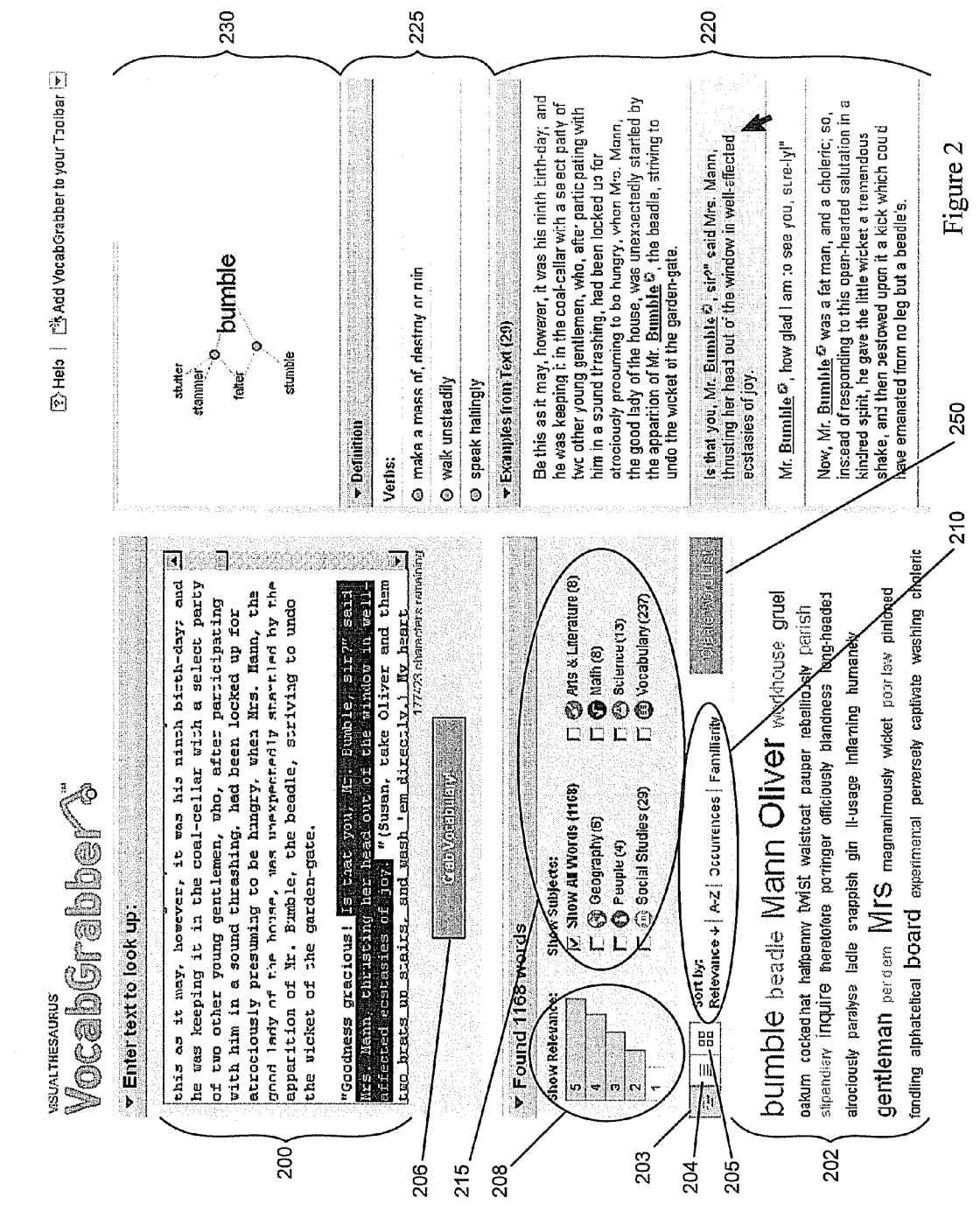

The system and method may provide a control, e.g., a selectable graphical control, for selection of one of the categories. In response to selection of one of the categories, the system and method may remove from the displayed word list all words and/or phrases whose calculated relevancy score falls in a relevancy category below the selected relevancy category, where the higher the relevancy category, the higher the scores in the category. Those words and/phrases that fall within the selected relevancy category or within a relevancy category higher than the selected relevancy category may remain displayed. For example, FIG. 2 illustrates selectable relevancy category bars, corresponding to categories 1 to 5, 5 being the highest category. Upon selection of a category bar, the selected category bar and all category bars corresponding to higher relevancy categories remain highlighted to visually indicate the selected relevancy category and to indicate that the words and/or phrases of the displayed word list in frame 202 of FIG. 2 are those whose calculated relevancy scores fall within the highlighted category or a higher category. The category bars corresponding to lower relevancy categories are not highlighted to visually indicate that the lower categories are not selected. In an example embodiment, if no words or phrases have a calculated relevancy score corresponding to a selected category, the next higher category is automatically selected. In an example embodiment, if no words or phrases have a calculated relevancy score corresponding to a selected category or to a higher category, bars corresponding to those categories are also not highlighted. In an alternative example embodiment, bars corresponding to the selected and higher categories nevertheless remain highlighted to visually indicate the categories that are selected.

The relevancy information can be used to quickly determine the content of the text provided to the system at step 110. Additionally, such information can be used for editing a literary work. For example, an author may run a literary work through the vocabgrabber system. If the system indicates that a high relevancy score has been calculated for a word that in fact is not highly relevant to the subject matter of the work, the author may take such information as an indication that the author may have used the word too many times and should consider revising the work to reduce the number of times the word is used.

In an example embodiment of the present invention, the system and method may display the words and/or phrases to convey additional information. For example, the sort order may convey the relevance as described above, the color may indicate a subject matter category with which it is most closely associated, and the font size may convey the frequency of the word and/or phrase in the input text. For example, the words displayed in frame 202 of FIG. 2 are displayed in order of relevance, but the fourth displayed word is the largest since it is the most frequent word in the input text.

In an example embodiment, the significance of one or more of the output features may be user-selectable. For example, the system and method may display sort options 210. If the user selects the "Occurrences" option, the system and method may responsively sort the words and/or phrases by frequency.

In an example embodiment, the system and method may also responsively set the font sizes according to relevancy. It is noted that other sorting options may be provided, such as an option to sort the words and/or phrases in alphabetical order, shown in FIG. 2 as the "A-Z" sort option.

In an example embodiment of the present invention, the font size of a listed word may be based solely on the absolute degree of relevance of the word to the text or frequency of the word in the text, without regard to the degrees of relevance or frequencies of other words of the text. For example, there may be a set font size for each calculated degree of relevance or frequency or for each of predetermined ranges of calculated degrees of relevance of frequencies. Alternatively, the sizes may be set in accordance with relative calculated relevancies or frequencies.

As noted above, in an example embodiment of the present invention, the system and method may indicate a subject category to which the various words and/or phrases of the received text belong. For example, the system and method may list subject categories, e.g., in a subject category list 215 as shown in FIG. 2. The listed subject categories may be displayed in different colors or with icons that are of different colors. The words and/or phrases displayed in frame 202 may be displayed in the colors in which the listed subject categories to which the words and/or phrases belong, or their corresponding icons, are displayed in the subject category list 215. The user may accordingly visually discern the subject categories with which the listed words and/or phrases are associated based on the color-coding of the words and/or phrases.

In an example embodiment of the present invention, for each listed subject category heading listed in the category list 215, the system and method may indicate the number of words and/or phrases of the received input text that are associated with the category, e.g., in a parenthetical as shown in FIG. 2.

In an example embodiment of the present invention, the system and method may provide for filtering of the listed words and/or phrases by the subject categories. For example, by default a "Show All Words" option may be selected in the subject category list 215, so that the subject categories to which the words and/or phrases belong do not impact whether the words and/or phrases are displayed. Additionally, for each of the listed subject categories, or for each of at least a subset of the listed subject categories, e.g., for each of the categories with which words and/or phrases of the text are associated, a respective check box may be displayed near the category. The check boxes may be selected, for example, in response to which the "Show All Words" option may be deselected, e.g., unless all of the other category check boxes are selected. The system and method may generate or modify the display such that only words and/or phrases corresponding to the subject categories whose corresponding check boxes have been selected, are displayed (unless the "Show All Words" option has been selected). In an example embodiment, in response to selection of the "Show All Words" option, check boxes associated with all of the listed subject categories are automatically checked.

In a example embodiment of the present invention, the system and method may display a hierarchical list of subject categories, and under each subject category heading for which there are words and/or phrases in the received text, the system and method may list those words and/or phrases.

For example, the system and method may include a database of words and/or phrases. The database may associate each of the words and/or phrases or a subset thereof with subject categories. The associations may be via any suitably appropriate method, e.g., via pointers or via record fields of a tab delimited file. Associations may be with lowest hierarchical level subjects (and, e.g., indirectly, with higher ones) or with higher hierarchical levels only. The database may further include a hierarchical structure of the subject categories. The system and method may match a word and/or phrase appearing in the text portion to a word and/or phrase in the database, and indicate the subject category or categories to which the word and/or phrase belongs, according to the indication of subject category in the database. In an example embodiment, the database may include only words and not phrases. Phrases may be matched to one or more categories associated in the database with the words of the phrase.

Indications of subject category may be, for example, by color coding as described above, a statement of the subject category, and/or by entry of the word under a subject category heading, e.g., where the subject categories are hierarchically displayed. For example, main categories may be listed at a first indentation level. Subcategories, one level below the main categories, may be listed immediately under the respective main categories to which they belong and indented with an increased indentation. Still other subcategories, at an even lower hierarchical level, may be similarly listed immediately below their respective categories of the immediately higher hierarchical level and with a still greater indentation. Under each heading, the words of the text portion that belong to the category may be displayed. The words may be displayed, e.g., under the lowest level displayed category to which it belongs. In an example embodiment, the category headings may be collapsible. In response to a collapse of a low level, the low level heading may be removed from display, and the words previously displayed under the low level heading may be displayed instead under the subject category heading of the next higher displayed subject category heading. In an example embodiment, if no words of the analyzed text portion are associated with a particular subject category, the heading for the category may be omitted from display.

Figures 3, 4:
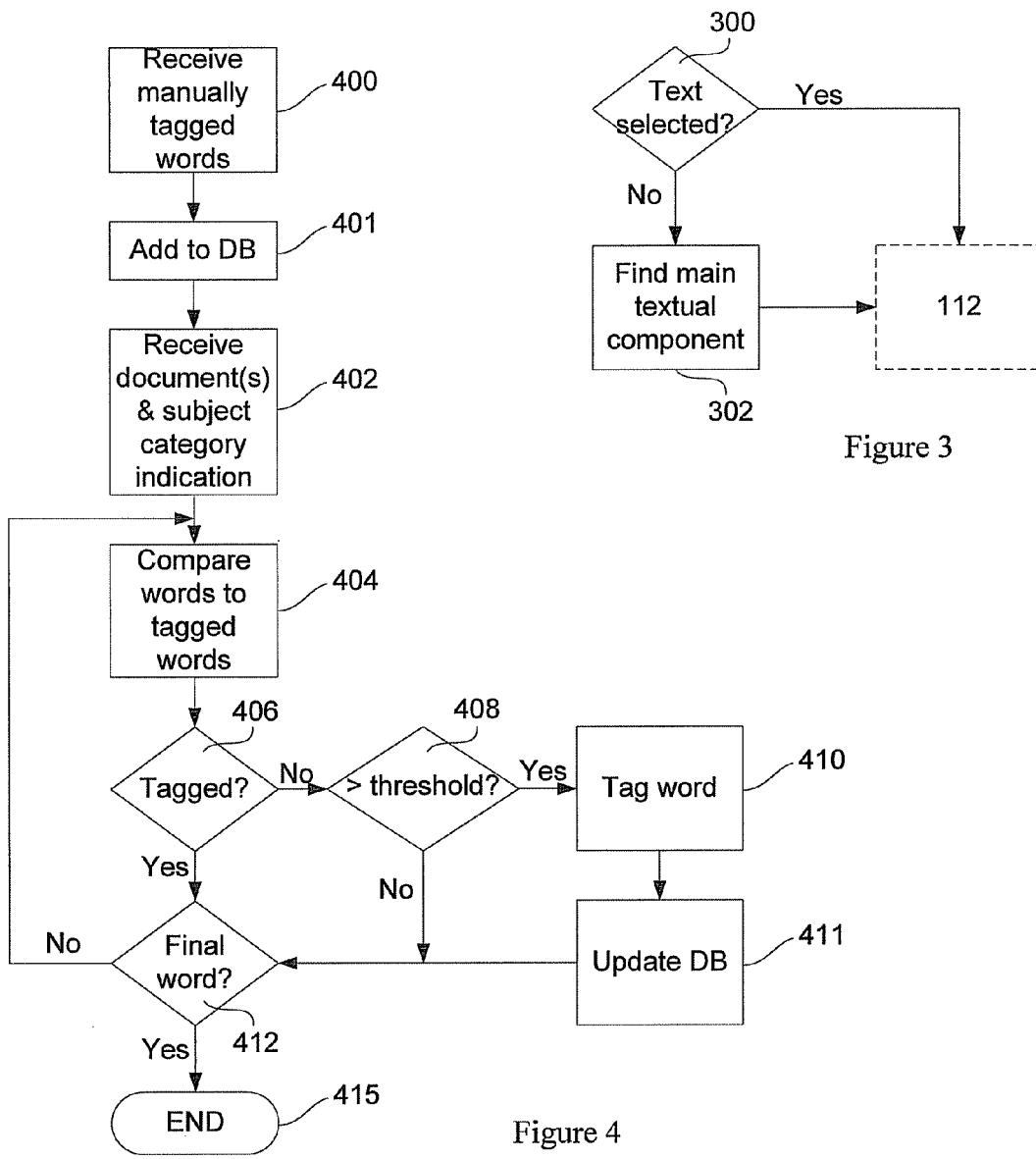
FIG. 3 is a flowchart that illustrates a method of obtaining text for analysis, according to an example embodiment of the present invention.
FIG. 4 is a flowchart that illustrates a method for associating words (and/or phrases) with subject categories, according to an example embodiment of the present invention.

FIG. 4 illustrates a method for populating the subject category database, according to an example embodiment of the present invention. At step 400, the system and method may receive a collection of words (and/or phrases) that have been manually tagged as belonging to certain subject categories. At step 401, the system and method may add the collection of words (and/or phrases) and their associated tags to the database.

At step 402, for example after a large number of tagged words have been received, the system and method may receive input of a document or a large corpus of documents pertaining to a subject category and may receive input of an indication of the subject category to which the document(s) pertains. For each different word (and/or phrase) of the document(s) received at step 402, the system and method may, at step 404, compare the word (and/or phrase) to tagged words (and/or phrases) of the database. Based on the comparison, the system and method may, at step 406, determine whether the word (and/or phrase) had been previously tagged, the determination that the word (and/or phrase) had been previously tagged being made if the word (and/or phrase) is found in the database. If it is determined that the word (and/or phrase) is already included in the database, the system and method may, at step 412, determine whether all words (and/or phrases) have been compared. If not all words (and/or phrases) have already been compared, the system and method may proceed back to step 404 to compare the next word (and/or phrase). Otherwise, the method may end at step 415.

If it is determined that the word (and/or phrase) is not included in the database, the system and method, may, at step 408, determine whether the word occurs in the document(s) received at step 402 more than a threshold number of times, the threshold being relative to the size of the document(s) measured by the number of words in the document(s).

In an example embodiment, the threshold is a single predetermined threshold value used for all words. In an alternative example embodiment, the threshold itself is at least partly automatically determined on a word by word (and/or phrase by phrase) basis, based on a ratio of instances of the respective word (and/or phrase) in a larger corpus of training material, e.g., as described above with respect to the relevancy determination. The system and method may add to the ratio a predetermined number or a predetermined percentage of the ratio to obtain the threshold.

For example, according to the former method of adding a predetermined number, if a word occurs in the corpus of training material at a rate of 20 times per 100 words (0.2), and if the predetermined added number is 0.1, then the threshold for the word would be set at 0.3, so that the threshold would be considered to be exceeded if the word occurs in the document(s) received at step 402 more than 3 times per 100 words. According to the latter method of adding a predetermined ratio percentage, if a word occurs in the corpus of training material at a rate of 20 times per 100 words (0.2), and if the predetermined added percentage is 0.5, then the threshold for the word would also be set at 0.3 (0.2+(0.2*0.5)), since 0.1 is again added to 0.2. However, according to the latter method, if the initial ratio is 0.3, then 0.15 would be added for a threshold of 0.45, to increase (compared to other words) the degree above baseline, required for determining a word's frequency as being due to its relationship to the subject category of the received document(s), proportionate to an increase (compared to other words) in the word's frequency over a large corpus of material.

If it is determined that the frequency of the word (and/or phrase) in the document(s) received at step 402 does not exceed the threshold, the system and method may proceed to step 412. If it is determined that the frequency of the word (and/or phrase) in the document(s) received at step 402 exceeds the threshold, the system and method may tag the word (and/or phrase) as being associated with the subject category of the document(s) received at step 402, and may, at step 411, update the database to include the newly tagged word (and/or phrase). The system and method may then proceed to step 412.

In an example embodiment, the database may be accessible to an administrator to modify the assignment of words (and/or phrases) to subject categories, since the frequency of a word (and/or phrase) in the document(s) received at step 402 may result in an incorrect tagging of the word (and/or phrase) as belonging to the subject category. In an example embodiment, prior to updating the database at step 411, the system and method may output the suggested word (and/or phrase) for tagging as belonging to the subject category and request user confirmation. According to this embodiment, the word (and/or phrase) may be added to the database at step 411 conditional upon such confirmation. According to this embodiment, the output and subsequent performance of step 411 may be separately performed for each word (and/or phrase) during each iteration of steps 404-412. Alternatively, the system and method may compile a list of tagged words (and/or phrases), and output the entire list after the final word has been compared and tagged. Step 411 may then be performed collectively for all confirmed words (and/or phrases).

In an example embodiment of the present invention, a word (and/or phrase) may be tagged for association with more than one subject matter category.

Other information regarding the words and/or phrases my include information regarding familiarity. For example, one of the sort options 210 may be by familiarity. In an example embodiment, the system and method may determine familiarity based on the number of times the words and/or phrases occur in the relevant language per a predetermined number of words, as determined by analysis of an input corpus of training material 150. For example, a word that occurs fifty times per three hundred words is considered more familiar than a word that occurs twenty times per three hundred words. In an example embodiment, other factors may be considered for the familiarity determination. For example, if a word predominantly occurs in very esoteric material of the corpus of training material 150, or in material which has been ranked as being of larger degree of difficulty than the majority of the corpus of training material 150. Such factors may be manually or automatically obtained. For example, an administrator of the vocabgrabber module(s) may input information regarding the esotericity and/or difficulty of portions of the corpus. Alternatively, the system may determine esotericity of a word and/or phrase based on the different subject categories with which the various portions of the corpus, in which the phrase and/or word appears, are associated. For example, if a word and/or phrase seldomly occurs in all passages but those associated with one or two of a plethora of subject categories, the system and/or method may determine the word and/or phrase to be esoteric. Additionally, in an example embodiment, the system and method may determine difficulty of a passage based on grammatical complexity of the passage, where complexity is determined using any suitably appropriate method.

In an example embodiment of the present invention, "Vocabulary" may be one of the subject matter categories with which words may be associated. In an example embodiment, aside from manual tagging of words as belonging to the "Vocabulary" subject category, the system and method may automatically tag a word as belonging to the "Vocabulary" subject category in response to a determination that the word is unfamiliar, as described above. This automatic tagging method for the "Vocabulary" subject category may be used in addition to the automatic tagging method described above. For example, the tagging of a word as belonging to the "Vocabulary" subject category may be performed differently than the tagging for other subject categories, which may be performed according to the methods described above. In an example embodiment, the familiarity-based tagging method and the tagging methods described above may be used in conjunction for the "Vocabulary" subject category.

In an example embodiment of the present invention, the system and method may include an intellisense feature to display a numeric representation of a word and/or phrase's relevance and/or frequency when, for example, a mouse pointer or cursor is positioned on or within close proximity of the word and/or phrase. For example, the system and method may output the numeric result of the equation used at step 116 and/or the number of instances of the word and/or phrase in the input text, counted at step 114. Alternatively or additionally, the system and method may output each variable of the equation used at step 116, i.e., the frequency in the input text, stored respective ratio, and the size of input text. For example, the variables may be displayed as two ratios, e.g., the stored respective ratio and a ratio of the frequency in the input text to the size of the input text.

In an example embodiment of the present invention, the various information may be displayed in tabular form. For example, a table may be displayed whose rows correspond to the various words and/or phrases, and whose columns include a relevance column in which the words' and/or phrases' relevance scores are displayed, a frequency column in which the words' and/or phrases' frequencies are displayed, and/or a subject matter column in which the words' and/or phrases' subject matter category is displayed. In an example embodiment of the present invention, the system and method may display selectable controls, e.g., buttons, for selecting a view in which the information is to be displayed. For example, with reference to FIG. 2, when a first button 203 is selected, the words and/or phrases may be displayed in a sorted list view, with different sizes and/or colors as described above, and when a second button 204 is selected, the information may be displayed in the described table.

In an example embodiment of the present invention, a web browser toolbar button may be provided, upon whose selection the vocabgrabber module may be invoked from any webpage.

FIG. 3 illustrates a method performed upon invocation of the vocabgrabber module via the toolbar button, as part of step 110 for receiving text upon which to perform the analysis described in detail above. At step 300, the system and method determines whether text has been selected in the active webpage of the browser window in which the toolbar button was selected. If text has been selected, the system and method proceeds to step 112 of FIG. 1 with the selected text as the received input text.

If text has not been selected, the system and method automatically selects text of the webpage at step 302 as the received input text and proceeds to step 112 of FIG. 1. For example, a webpage usually includes a number of components, which may include, graphical components, textual components, links, etc. In an example embodiment, the system and method may initially select the textual components. The system and method may then sort the textual components by size, e.g., measured in word length, and select the largest textual component as the received input text. The largest textual component may be selected, because the inventors have found that the component including the largest portion of text in a webpage is often the component that includes the feature portion of the webpage.

Alternatively or additionally, other factors may be considered for determining to which component to apply the vocabgrabber analysis. For example, the system and method may ignore or assign a lower value to components including lists or composed solely of lists as these often relate to search result hits or advertisements. The system may also consider metadata information regarding the components for the determination. In an example embodiment, a number of factors may be considered in combination. In an example embodiment, different weightings may be given to the different factors. For example, length of the text portion of the component may be one factor and whether a component includes a list or is solely a list may be another factor.

In an example embodiment of the present invention, in response to selection of the toolbar button, the system and method navigates to a separate window dedicated to the vocabgrabber module(s), e.g., as illustrated in FIG. 2. The selected text of the webpage may be imported into the textbox 200 and the analysis results may be displayed in other parts of the dedicated window as illustrated in FIG. 2. Alternatively, a new frame may be displayed for the vocabgrabber module(s) in the same window as the webpage from which the text was selected is displayed.

In an example embodiment of the present invention, the words of frame 202 or that are presented in the table according to the analyses described above are selectable. Upon selection of a word, the system may display the immediately surrounding context of the word, e.g., all sentences in which the word appears in the text portion, e.g., as shown in frame 220 of FIG. 2. In FIG. 2, the word "Bumble" has been selected from the word list of frame 202. Therefore, in frame 220, all sentences (or portions of sentences) in which the "Bumble" occurs in the analyzed text of textbox 200 are displayed. If there are more instances of the selected word that can be displayed simultaneously in frame 220, a scroll bar may be displayed for scrolling through the instances of the word's (and/or phrase's) use.

In an example embodiment of the present invention, the displayed instances are selectable, e.g., via a mouse click and/or a keyboard control, and/or any other suitably appropriate selection device. Upon selection of an instance, if the instance (or at least a portion thereof) is not already displayed in the textbox 200, the system and method may automatically scroll the text of textbox 200, such that the selected instance or at least a portion thereof (for example, at least the portion including the corresponding occurrence of the word (and/or phrase)) is displayed in the textbox 200, for example, at a predetermined location, e.g., the top, bottom, or center of the textbox 200. Alternatively, its position may depend on the direction of scrolling required for the display of the relevant text. In an example embodiment, the system and method may further highlight the instance in the textbox 200, so that the user's attention can be immediately directed to the larger context of the word's (or phrase's) usage. The display of the context may give the user a greater appreciation of the significance of the word (or phrase) in the input text. In an example embodiment, the system and method may further highlight in frame 220 and/or in the textbox 200, or display, in frame 220 and/or in the textbox 200, in a color different than surrounding words, the word or phrase selected in frame 202. For example, each occurrence of the word "Bumble" in frame 220 is shown in a distinctive color. In addition, or alternatively, any other suitably appropriate distinctive feature, e.g., italicization, may be applied to the word and/or phrase.

In an example embodiment of the present invention, the system and method may display one or more definitions of a selected word, e.g., as shown in frame 225 of FIG. 2. For example, the system and method may access an electronic dictionary to obtain the definitions. Similarly, synonyms and/or antonyms may be additionally or alternatively displayed, e.g., depending on a user selection.

In an example embodiment of the present invention, the system and method may display a word association map for a selected word, e.g., as in frame 230 of FIG. 2. The word association map may display the selected word and words associated with the selected word, where the associated words are connected to the selected word via edges. The type of connection may indicate the way in which the associated words are associated with the selected word. For example, the connection may indicate that one or more words correspond to a first definition of the selected word, while one or more other words correspond to a second definition of the selected word. For example, "stutter" and "stammer" may be grouped together for a first connection to a selected word "bumble," where the first connection includes a node identified as corresponding to the definition "speak haltingly," while the word "stumble" may be provided with a second connection to the selected word "bumble," where the second connection includes a node identified as corresponding to the definition "walk unsteadily." Yet another word, "falter," may be part of both connections. The identification of the node may be output, e.g., upon selection of or pointing to the node. The word association map may include any of the features of the word association maps described in, and may be generated using any of the methods described in, e.g., U.S. Pat. No. 6,801,229 and/or U.S. Patent Application Publication No. 2005/0171760, the content of each of which is incorporated by reference in its entirety. For example, the word association map may include any of the features of the VISUAL THESAURUS® by THINKMAP®.

In an example embodiment of the present invention, the system and method may further display a third button 205, responsive to selection of which the system and method may display, for each of the words in the analyzed text received at step 110 (described above), a respective, e.g., expandable, thumbnail view of the word's respective word association map. For example, a gallery of the thumbnails may be displayed instead of the word list of frame 202, or may be displayed in a separate window, e.g., overlaid on the window including the word list of frame 202 (or the table described above). In an example embodiment, the thumbnails may be displayed in the order of degree of relevancy of the maps' corresponding words.

In an example embodiment, the system and method provides for generating vocabulary word lists using the words of the analyzed text obtained at step 110. For example, the system may store a word-list template data structure. A user may select words output based on the analysis of the text portion, for inclusion of the selected words in a new word list generated based on the word-list template data structure. Alternatively or in addition, the system may automatically select the words to be included. For example, the system may automatically select those words that have been tagged as associated with the "Vocabulary" subject matter category; those words that have been assigned familiarity scores below (or above, depending on the scoring method) a certain threshold, indicating the words to be unfamiliar; a predetermined number of words that have been assigned the lowest familiarity scores among all of the listed words; or all of the presented words. For example, which words are selected for the word list may be dependent upon the selected filter criteria (described in detail above). Further, the order in which the words are sorted may be in the sort order selected by the user (as described in detain above). The word selection and subsequent word-list generation may be performed responsive to user-selection of a control, e.g., a "Create Word List" button 250. According to the embodiment in which words may be manually selected, the system may initially present to the user a list of the words of the text obtained at step 110, from which words are user-selectable. In an example embodiment, the system may initially generate a list of words to be included in the word list according to the automatic criteria discussed above, and may provide a user-interface via which the user may deselect any of the words.

Additional information may be included in the vocabulary lists. For example, the system may include one or more definitions, synonyms, and/or antonyms of the words. Additionally, the system may provide a user interface including for each of the words selected for inclusion in the word list, immediate surrounding context of the word in the text received at step 110, as described above with respect to frame 220. The user interface may be user-interactive, such that the user can select one of the context sentences for inclusion in the word list.

After user-input indicating finalization of the word list options, e.g., which words to include, which context sentences to include, etc., the system may generate the word list. The generated word list may be saved as a file in a word list database, from which the user may later retrieve and open the file for output, e.g., on a computer monitor, printer, or any other suitably appropriate output device. The file name may be automatically generated or user-selected.

The word-list feature may be used, e.g., to create vocabulary lists of words that pertain to other subjects studied by students to whom the vocabulary lists will be presented. For example, text books or portions thereof used in a classroom setting may be input to the vocabgrabber module(s) to obtain the relevant words for inclusion in the vocabulary lists.

Figure 5:
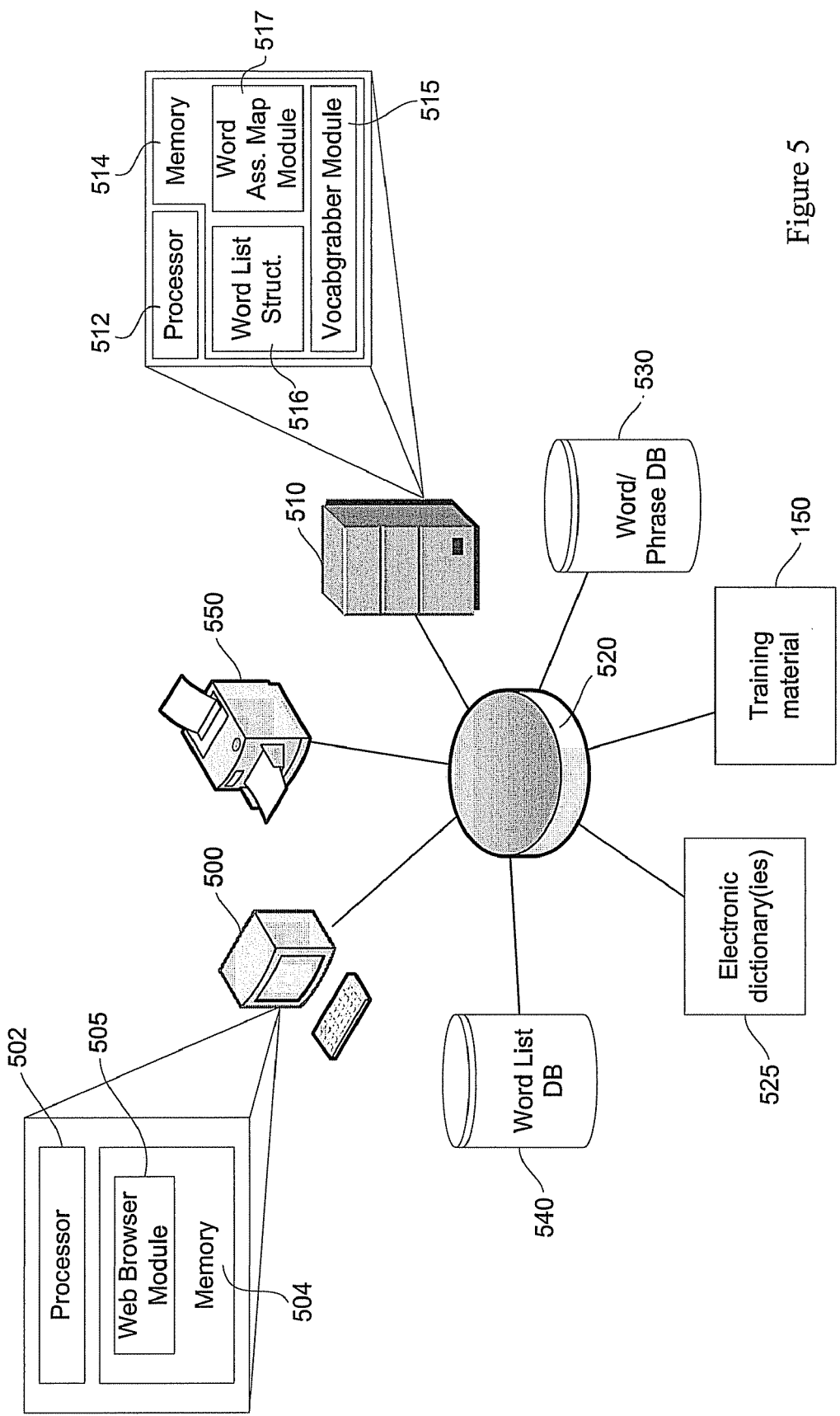
FIG. 5 is a diagram that illustrates components of a system, according to an example embodiment of the present invention.

FIG. 5 shows components of a system in which the described methods may be implemented, according to an example embodiment of the present invention. A client workstation 500 may include a processor 502 and a memory 504. The memory may store a web browser module 505, via execution of which, by the processor 502, the client workstation may access a web page provided by a server 510. The access may be through a network 520, e.g., the Internet, another network, or a combination of network types. The server 510 may include a processor 512 and a memory 514. The memory 514 may store a vocabgrabber module(s) 515, a word-list template data structure 516, and a word-association map module(s) 517.

The processor 512 may process requests from the web browser module 505 to serve one or more webpages to the client workstation 500. The webpages may include embedded therein copies of one or more of the vocabgrabber module(s) 515, word-list template data structure 516, and word-association map module(s) 517, or portions thereof. Alternatively, or additionally, the returned page may include components for invoking a request back to the server 510 for the processor 512 to execute the vocabgrabber module(s) 515 and word-association map module(s) 517, or portions thereof, and/or to instantiate the word list structure 516. Thus, the processes described in detail above may be performed at the client work station 500, at the server 510, or by a combination of the two. Moreover, functions of the server 510 may be divided among a plurality of servers 510. For example, the vocabgrabber module(s) 515 may be stored and/or served and/or executed at a first server 510, and the word-association map module(s) 517 may be stored and/or served and/or executed at a second server 510.

The vocabgrabber module(s) 515 may access the training material 150 for obtaining word relevancy comparison ratios. The training material 150 may be accessible via the network 520 or may be locally stored, e.g., at the server 510. In an example embodiment, the server processor 512 executes the vocabgrabber module(s) 515 for accessing the training material 150 to obtain the relevancy comparison ratios, which may be stored, e.g., in the server memory 514 or other accessible storage location. The training material 150 may be updated overtime, and the relevancy comparison ratios may be updated in accordance with such update of the training material 150. According to an embodiment in which the workstation processor 502 executes the vocabgrabber module(s) 515 for analysis of a document 160, e.g., obtained via a local input device of the workstation 502 or from a webpage obtained by the web browser module 505, the vocabgrabber module(s) 515 executing on the workstation 500 may access the relevancy comparison ratios obtained by execution of the vocabgrabber module(s) 515 executing on the server 510.

The word-association map module(s) 517 may access an electronic dictionary 525, e.g., via the network 520 or that is locally stored, for generating the word-association maps. Similarly, the vocabgrabber module(s) 515 may access the electronic dictionary 525 to present definitions of words of the input document 160.

A word/phrase database 530 may be stored on the network 520. The word/phrase database 530 may be populated with words and associations of the words with subject categories, as described in detail above. Each word of the database 530 may be associated with one or more subject categories. The vocabgrabber module(s) 515, executing at the server 510 or at the workstation 500, may access the database 530 for the subject category determinations described above, and for updating the database 530. Although not shown, subject-associated documents may be stored on the network, which may be updated over time and which may be accessed for the automatic subject category determinations described in detail above.

A word list database 540 may be stored on the network 520. In an example embodiment, the word list database 540 is locally stored in the workstation memory 504. The word list database 540 may be populated, as described in detail above, by execution of an instantiation of the vocabgrabber module(s) 515 executed during a workstation session, by the workstation processor 502 or by the server processor 512. Different word list databases 540 may be stored for different workstations 500 or for different users of a workstation 500. Word lists of the word list database 540 may be opened, e.g., at the workstation 500 and reproduced via an output device, e.g., a printer 550.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method for at least one of updating and using a data store of words associated with subject matter categories, comprising:

comparing, by a computer processor, words of a received document to words of a data store that are tagged with respective indications of subject matter categories to which the words of the data store belong;

for each word of the received document that does not match any of the tagged words of the data store, determining, in a first determining step and by the processor, whether a frequency of the word in the received document meets a frequency threshold; and for each word for which it is determined in the first determining step that the frequency of the word meets the frequency threshold:

tagging the word, by the processor, as belonging to a subject matter category with which the received document is associated; and updating the data store, by the processor, to include the word with its tag.

2. The method of claim 1, wherein:

the subject matter categories are of a subject matter category hierarchy that includes a plurality of subject matter categories; and the method further comprises:

for each of a plurality of words of a text, determining, in a second determining step and by the at least one computer processor, at least one of the plurality of subject matter categories to which the word belongs;

receiving user input of a hierarchy level selection; and for each of at least a subset of the plurality of words, outputting, by the at least one computer processor and based on the user input, an indication of those of the respective at least one subject matter category that are at a hierarchical level at least as high as the selected hierarchy level and to which the respective word has been determined to belong in the second determining step.

3. The method of claim 2, wherein the second determining step is performed by matching the respective word to a tagged word of the data store.

* * * * *